United States Patent [19]
Tsuchida

[11] Patent Number: 6,104,545
[45] Date of Patent: Aug. 15, 2000

[54] GRADIENT INDEX LENS COMPONENT AND IMAGE PICKUP APPARATUS USING THE GRADIENT INDEX LENS

[75] Inventor: Hirofumi Tsuchida, Hachioji, Japan

[73] Assignee: Olympus Optical Co., Ltd., Tokyo, Japan

[21] Appl. No.: 09/197,201

[22] Filed: Nov. 20, 1998

Related U.S. Application Data

[62] Division of application No. 08/691,575, Aug. 2, 1996, Pat. No. 5,870,229.

[30] Foreign Application Priority Data

Aug. 4, 1995 [JP] Japan .................................. 7-218334

[51] Int. Cl.$^7$ .............................. G02B 9/00; G11B 7/00
[52] U.S. Cl. ...................... 359/654; 359/661; 359/719; 359/738; 369/112
[58] Field of Search .......................... 359/719, 652–654, 359/738, 661; 369/112

[56] References Cited

U.S. PATENT DOCUMENTS

| | | | |
|---|---|---|---|
| 4,887,026 | 12/1989 | Takahashi et al. ...................... | 359/652 |
| 4,976,521 | 12/1990 | Ishii ....................................... | 359/654 |
| 4,986,642 | 1/1991 | Yokota et al. ........................... | 359/738 |
| 4,998,807 | 3/1991 | Uzawa .................................... | 359/654 |
| 5,059,005 | 10/1991 | Kawano ................................. | 359/654 |
| 5,117,309 | 5/1992 | Aoki ....................................... | 359/654 |
| 5,371,632 | 12/1994 | Naiki et al. ............................. | 359/719 |
| 5,424,877 | 6/1995 | Tsuyuki et al. ......................... | 359/663 |
| 5,475,523 | 12/1995 | Shinada .................................. | 359/652 |
| 5,619,380 | 4/1997 | Ogasawara et al. .................... | 359/661 |
| 5,870,229 | 2/1999 | Tsuchida ................................ | 359/654 |
| 5,995,295 | 11/1999 | Nagaoka ................................ | 359/654 |
| 5,999,327 | 12/1999 | Nagaoka ................................ | 359/654 |

FOREIGN PATENT DOCUMENTS

| | | |
|---|---|---|
| 50-011045 | 2/1975 | Japan . |
| 52-029238 | 4/1977 | Japan . |
| 60-091316 | 5/1985 | Japan . |
| 60-140307 | 7/1985 | Japan . |
| 1-45887 | 10/1989 | Japan . |
| 4-191716 | 7/1992 | Japan . |

OTHER PUBLICATIONS

"Design of a Gradient–Index Photographic Objective" Atkinson et al., Applied Optics, vol. 21, No. 26, Mar. 15, 1982.

Radial Gradient–Index Lenses with Zero Petzval Aberration–Moore et al., Applied Optics, vol. 19, No. 7, Apr. 1, 1980.

*Primary Examiner*—Georgia Epps
*Assistant Examiner*—Evelyn A. Lester
*Attorney, Agent, or Firm*—Pillsbury Madison & Sutro LLP

[57] ABSTRACT

A gradient index lens component composed of a single radial type gradient index lens element which has planar surfaces on both side and a positive refractive power and comprising an aperture stop which is disposed in the vicinity of an object side surface of the radial gradient index lens element for restricting a light bundle. And an image pickup apparatus composed by integrating the gradient index lens component with an image pickup device.

25 Claims, 5 Drawing Sheets

GRADIENT INDEX LENS COMPONENT AND IMAGE PICKUP APPARATUS USING THE GRADIENT INDEX LENS

This is a division of application Ser. No. 08/691,575, filed Aug. 2, 1996, now U.S. Pat. No. 5,870,229.

BACKGROUND OF THE INVENTION a) Field of the invention

The present invention relates to a gradient index lens component which is suited for use as an image pickup lens component in electronic image pickup apparatuses such as video cameras and also to an image pickup apparatus using the gradient index lens component.

b) Description of the prior art

In recent years, now that electronic image pickup apparatuses are widely used in domestic video cameras, television telephones and door phones with cameras, it is an important theme to develop a compact lens system which is usable in these electronic image pickup apparatuses and can be manufactured at a low cost. Each of conventional lens systems which are used in these electronic image pickup apparatuses is generally composed of three to six lens elements, whereas there are known other lens systems each of which is composed of a single lens element for configuring the electronic image pickup apparatuses compactly and manufacturing them at low cost. As a conventional example of the conventional lens systems each composed of a single lens element, Japanese Patent Kokai Publication No. Hei 4-191716 discloses a lens system which uses an aspherical surface. As lens systems which are to be used for different purposes, Japanese Patent Kokai Publication No. Sho 60-91316 discloses a gradient index rod lens element having planar surfaces on both sides which is to be used as a collimator for a laser, Japanese Patent Kokai Publication No. Sho 50-11045 proposes a gradient index rod lens element having planar surfaces on both sides which is to be used as an optical fiber connector and Japanese Patent Kokai Publication No. Sho 60-140307 discloses a lens component composed of a single lens element having a concave surface on the object side and a planar surface on the image side which is to be used as an optical pickup and a collimator for lasers. Further, known as an objective lens system for endoscopes consisting of two lens elements is a lens system disclosed by Japanese Patent Kokai Publication No. Sho 52-29238 which is composed of a combination of a homogenous concave lens element and a gradient index lens element having planar surfaces on both sides.

Out of the conventional examples mentioned above, the lens system which is composed of the three to six lens elements has the drawbacks that it has high manufacturing cost due to the large number of lens elements and allows optical performance to be degraded due to assembling errors. Further, the lens system disclosed by Japanese Patent Kokai Publication No. Hei 4-191716 which is composed of the single lens element has a defect that it produces curvature of field, distortion and chromatic aberration in large amounts. Each of the gradient index lens elements which are disclosed by Japanese Patents Kokai Publication No. Sho 60-91316 and No. Sho 50-11045 which have the planar surfaces on both the sides is configured for picking up monochromatic images has optical performance mainly for axial rays, produces offaxial aberrations in large amounts, and does not take chromatic aberration into consideration. The lens system disclosed by Japanese Patent Kokai Publication No. Sho 60-140307 which is composed of the single gradient index lens element having the concave surface on the object side and the planar surface on the image side produces astigmatism in a large amount and does not take chromatic aberration into consideration. Furthermore, the lens system disclosed by Japanese Patent Kokai Publication No. Sho 52-29238, which is composed of the two lens elements, has drawbacks that it requires high manufacturing cost and that it produces chromatic aberration in a large amount.

SUMMARY OF THE INVENTION

A primary object of the present invention is to provide a gradient index lens component which is composed of a single lens element, can be manufactured at a low cost and has favorable optical performance, and an image pickup device using the lens component.

The gradient index lens component according to the present invention is characterized in that it is composed of a single radial type gradient index lens element which has planar surfaces on both sides, a positive refractive power and a refractive index distribution expressed by the formula shown below, and that it satisfies the condition (1) mentioned below:

$$n(r)=N_0+N_1r^2+N_2r^4+\ldots \quad -0.015<1/V_1<0.015 \tag{1}$$

wherein the reference symbol $n(r)$ represents a refractive power of a lens portion located at a distance r as measured from an optical axis in a direction perpendicular to the optical axis, the reference symbol $N_0$ designates a refractive index of a lens portion located on the optical axis, the reference symbols $N_1$, $N_2$, ... denote refractive index distribution coefficients of the second, fourth, ... orders respectively, and the reference symbol $V_1$ represents a coefficient expressing an Abbe's number of a medium which is determined by the following formula:

$$V_1=N_{1d}/(N_{1F}-N_{1C})$$

wherein the reference symbols $N_{1d}$, $N_{1F}$ and $N_{1C}$ represent values of the coefficient $N_1$ for the d-line, F-line and C-line respectively.

Further, it is desirable that the lens component according to the present invention satisfies the following conditions (2), (3) and (4):

$$1<t/f<3.5 \tag{2}$$

$$-0.2<f^4\cdot N_2<0.2 \tag{3}$$

$$-2<d/t<0.5 \tag{4}$$

wherein the reference symbol f represents a focal length of the lens component, the reference symbol t designates thickness of the lens component and the reference symbol d denotes a distance as measured from a surface of an object to be observed to an aperture stop in a direction along an optical axis.

In another respect, the present invention provides an image pickup apparatus which is composed by integrating a radial type gradient index lens element with an image pickup device.

The image pickup apparatus according to the present invention consists of the radial type gradient index lens component according to the present invention and the image pickup device mentioned above.

DETAILED DESCRIPTION OF THE PREFERRED EMBODIMENTS

The photographic lens component according to the present invention is composed of a radial type gradient index lens element which has planar surfaces on both sides and a positive refractive power, and satisfies the condition (1) as described above.

The photographic lens component according to the present invention is composed of a single radial type gradient index lens element having planar surfaces on both sides for correcting the defects of the conventional photographic lens components of the similar types. By composing the photographic lens component of the single gradient index lens element, it is possible to reduce manufacturing cost of the lens element itself owing to a simplified composition, and to obtain remarkable merits owing to extremely reduced influences due to working and assembling errors. Further this composition leads to a simplified lens barrel.

At a specific wavelength, a radial type gradient index lens element has a refractive index distribution expressed by the following formula (a):

$$n(r)=N_0+N_1 \cdot r^2+N_2 \cdot r^4+ \ldots \quad (a)$$

wherein the reference symbol r represents a distance as measured from an optical axis in a direction perpendicular to the optical axis, the reference symbol n(r) designates a refractive index at a radial distance of r, the reference symbol $N_0$ denotes a refractive index on the optical axis, and the reference symbols $N_1$, $N_2$, . . . represent refractive index distribution coefficients.

The refractive index distribution coefficients have values which are different dependently on wavelengths. When the distribution coefficients at different wavelength are followed by symbols representing the wavelengths (for example, d, C and F), Abbe's numbers of the radial type gradient index lens element is given by the following formulae (b) and (c).

$$V_0=(N_{0d}-1) / (N_{0F}-N_{0C}) \quad (b)$$

$$V_i=N_{id}/(N_{iF}-N_{iC}) \ (i=1, 2, \ldots) \quad (c)$$

wherein the reference symbols $N_{0d}$, $N_{0F}$ and $N_{0C}$ represent refractive indices on the optical axis for the d-line, F-line and C-line respectively, and the reference symbols $N_{id}$, $N_{iF}$ and $N_{iC}$ designate the distribution coefficients $N_i$ for the d-line, F-line and C-line respectively.

As stated in Applied Optics Vol. 1, p993 ~(hereinafter referred to as document A), for example, it is known that radial type gradient index lens elements are capable of correcting curvature of field, chromatic aberration, spherical aberration and so on more favorably than the conventional homogenous lens elements. As reported by Applied Optics Vol. 19, p 1081 ~(hereinafter referred to as document B), however, it is said that the radial type gradient index lens elements are incapable of correcting delicate aberrations including longitudinal chromatic aberration and lateral chromatic aberration in addition to the so-called Seidel's five aberrations. Accordingly, it is necessary to dispose two radial type gradient index lens elements so as oppose to each other on both sides of a stop, as described in the document A, for correcting the delicate aberrations including the seven aberrations mentioned above.

Paying attention to a fact that curvature of field and distortion in small amounts are allowed in actual photographing lenses and so on, the inventor conceived an optical system in which aberrations are corrected to levels practically required for lens systems with a single radial type gradient index lens element which has planar surfaces on both sides. When a lens system is to be composed of a single radial type gradient index lens element, it is necessary, from a viewpoint of paraxial layout, to select a maximum difference in refractive indices which is small enough so that a material for the lens element is easily available. The correction of aberrations, curvature of field, spherical aberration, astigmatism and chromatic aberration, in particular, pose problems.

First, for favorably correcting longitudinal chromatic aberration and lateral chromatic aberration, the lens component according to the present invention which has the composition described above is configured so as to satisfy the following condition (1):

$$-0.015<1/V_1<0.015 \quad (1)$$

If the upper limit of the condition (1) is exceeded, a medium will produce remarkable chromatic aberration, whereby the lens system as a whole will produce longitudinal chromatic aberration and lateral chromatic aberration in amounts that are too large. If the lower limit of the condition (1) is exceeded, longitudinal chromatic aberration and lateral chromatic aberration will be overcorrected.

When the photographic lens component is to be used in combination with an image pickup device which has a large number of picture elements and requires suppressing lateral chromatic aberration to a lower level, in particular, it is desirable to satisfy, in place of the condition (1), the following condition (1—1):

$$-0.01<1/V_1<0.01 \quad (1—1)$$

Speaking of the paraxial layout, in the next place, it is known that a refractive power $\phi_m$ is approximated by the following formula (d):

$$\phi_m=-2N_1 t \quad (d)$$

wherein the reference symbol t represents thickness of the radial type gradient index lens element.

When a photographic lens component is to be composed of a single radial type gradient index lens element which has planar surfaces on both sides, it is necessary to select a medium having a strong refractive power since the surfaces have no refractive powers and all refractive power required for the lens component must be supplied by the medium. For strengthening a refractive power, however, it is necessary to increase the distribution coefficient $N_1$ or thickness t as understood from the formula (d). When the distribution coefficient $N_1$ is too large, however, a maximum difference in refractive indices is too large between a central portion and a marginal portion of the lens element, thereby making it difficult to prepare a material for the lens element. For obtaining a predetermined refractive power by adequately increasing thickness t, the present invention adopted the following condition (2):

$$1 < t/f < 3.5 \tag{2}$$

The condition (2) is required for imparting an adequate refractive power to a medium without extremely increasing the maximum difference in refractive indices. If the lower limit of the condition (2) is exceeded, the maximum difference in refractive indices will be too large, thereby making it difficult to prepare a material. If the upper limit of the condition (2) is exceeded, an image even of an object located at a short distance will be formed in the lens element, thereby making it impossible to focus it.

Now, description will be made of correction of aberrations in the lens component according to the present invention. First, curvature of field will be discussed. A Petzval's sum PTZ of a radial type gradient index lens element is given by the following formula (e):

$$PTZ = (\phi_s/N_0) + (\phi_m/N_0^2) \tag{e}$$

wherein the reference symbol $\phi_s$ represents a refractive power only of surfaces of the radial type gradient index lens element and the reference symbol $\phi_m$ designates a refractive power only of a medium of the radial type gradient index lens element.

From the formula (e), it will be understood that a radial type gradient index lens element having a lens function only of a medium has a Petzval's sum which is $1/N_0$ times as large as that of a radial type gradient index lens element having a lens function only of surfaces. Accordingly, a Petzval's sum of a single homogenous lens element can be improved to $1/N_0$ by using a radial type gradient index lens element even when it has planar surfaces on both sides. Though a positive Petzval's sum and negative curvature of field remain in the end in the radial type gradient index lens element, they are in amounts smaller than those in the single homogenous lens element and at levels allowable from a viewpoint of practical use. In cases of endoscopes or the similar optical instruments to be used for observing or photographing objects which are curved like insides of domes, in particular, it is rather desirable to allow negative curvature of field to remain in a small amount. However, it is generally desirable to select the base refractive index $N_0$ of at least 1.6 and correct curvature of field at a lower level.

For favorably balancing spherical aberration in the photographing lens component according to the present invention, it is desirable to configure it so as to satisfy the following condition (3):

$$-0.2 < f^4 \cdot N_2 < 0.2 \tag{3}$$

For a gradient index lens element, it is possible, without changing power distribution in the lens element as a whole, to control spherical aberration by changing the refractive index distribution coefficient $N_2$. Judging from a level of curvature of field, however, it is desirable to slightly undercorrect spherical aberration for allowing a central portion and a marginal portion to form images at locations close to each other. The condition (3) defines a requirement for such formation of images. If the lower limit of the condition (3) is exceeded, spherical aberration will be undercorrected. If the upper limit of the condition (3) is exceeded, spherical aberration will be overcorrected.

For more favorable correction of aberrations, however, it is desirable to satisfy, in place of the condition (3), the following condition (3-1):

$$-0.1 < f^4 \cdot N_2 < 0.1 \tag{3-1}$$

Astigmatism should preferably be corrected as favorably as possible and it is desirable for this purpose to satisfy the following condition (4):

$$-2 < d/t < 0.5 \tag{4}$$

The condition (4) defines a location of a stop. An astigmatic difference can be reduced by disposing a stop in the vicinity of an object side surface of a lens element within a range defined by the condition (4). If the lower limit of the condition (4) is exceeded, a meridional image surface will be remarkably tilted in the negative direction, thereby aggravating astigmatism. If the upper limit of the condition (4) is exceeded, the meridional image surface will be remarkably tilted reversely in the positive direction, thereby aggravating astigmatism.

When all the conditions mentioned above are satisfied, distortion will be slightly negative or will have the so-called barrel form, but will be at an allowable level. When it is necessary to suppress distortion to a low level, in particular, it can be corrected electrically.

First through fourth embodiments of the gradient index lens component (photographic lens component) have compositions illustrated in FIGS. 1 through 4 respectively. Out of these photographic lens components, a photographic lens component which is preferred as the first embodiment has a composition shown in FIG. 1, wherein the lens component is composed of a radial type gradient index lens element 1 having planar surfaces on both sides, a stop 2 is disposed on a surface of incidence of the gradient index lens element 1 and an image surface is located outside the gradient index lens element 1. Further, the gradient index lens element is configured so as to satisfy the conditions (1), (2), (3) and (4).

Figure 2:
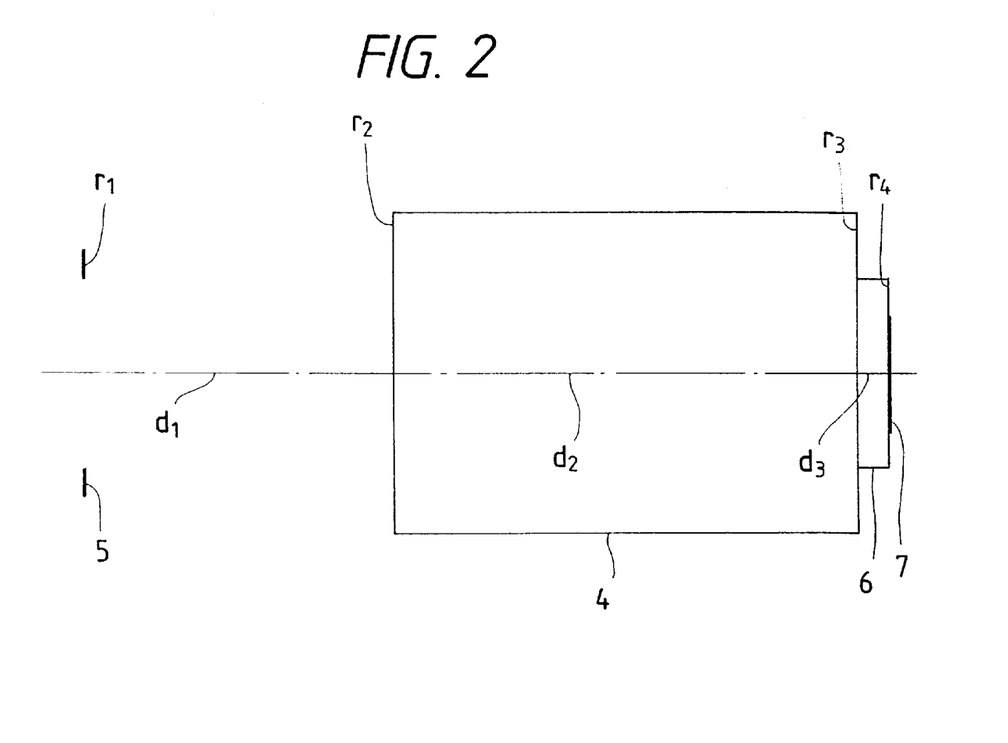

In the second embodiment shown in FIG. 2, a gradient index lens component (photographic lens component) is composed of a radial type gradient index lens element 4 having planar surfaces on both sides, a stop 5 is disposed at a location on the object side of a surface of incidence of the gradient index lens element 4, a resin layer is disposed on a surface of emergence of the gradient index lens element 4 and an image surface is located on a surface of the resin layer which is opposite to the surface of the gradient index lens element.

Figure 3:
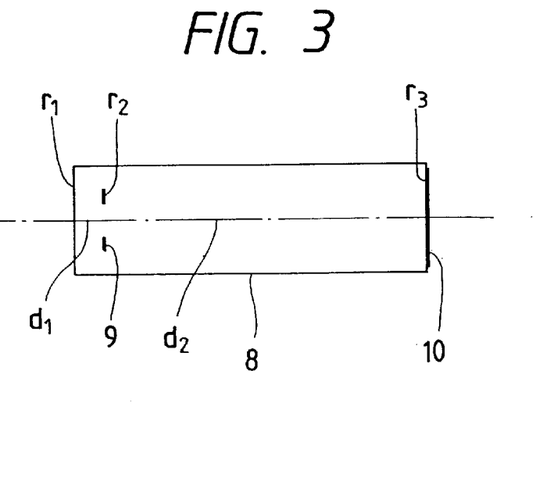

The third embodiment illustrated in FIG. 3 has a composition wherein a gradient index lens component (photographic lens component) is composed of a radial type gradient index lens element 8 having planar surfaces on both sides, a stop 9 is disposed in the vicinity of or inside a surface of incidence of the radial type gradient index lens element 8 and an image surface is located on a surface of emergence of the gradient index lens element 8.

Figure 4:
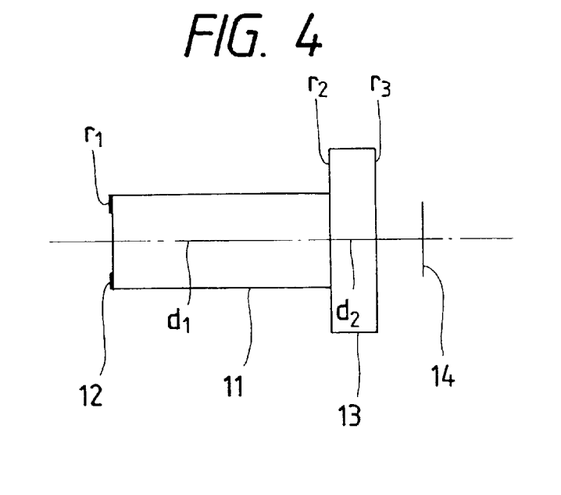

The fourth embodiment illustrated in FIG. 4 has a composition wherein a gradient index lens component (photographic lens component) consists of a radial type gradient index lens element 11, a stop 12 is disposed on a surface of incidence of the radial type gradient index lens element 11 and a protective glass plate 13 is disposed on a surface of emergence of the radial type gradient index lens element 11 so as to form an image outside the surface of emergence.

The second, third and fourth embodiments illustrated in FIGS. 2 through 4 are configured, like the first embodiment, so as to satisfy the conditions (1), (2), (3) and (4).

Now, description will be made of numerical data selected for the first through fourth embodiments of the gradient index lens component (photographic lens component) according to the present invention. The d-line is selected as a standard wavelength in the numerical data:

Embodiment 1 f=6, F/2.0, max. image height=1.5, field angle 2 ω=28.9°

$r_1=\infty$ (stop)

$d_1 = 13.355$   $n_1$ (gradient index lens)

$r_2=\infty$
gradient index lens
   $N_0=1.60$, $N_1=-0.89106\times10^{-2}$, $N_2=-0.20248\times10^{-4}$
   $V_0=45.0$, $V_1=145.0$, $V_2=145.0$
   t/f=2.23, $f^4 \cdot N_2=-0.0262$, d/t=0, $1/V_1=0.007$ Embodiment 2 f=6, F/1.0, max. image height=1.8, field angle 2 ω=34.9°

$r_1=\infty$ (stop)
   $d_1=9.800$
$r_2=\infty$ $d_2 = 14.795$   $n_1$ (gradient index lens)

$r_3=\infty$ $d_3 = 1.000$   $n_2 = 1.49216$   $v_2 = 57.5$ $r_4=\infty$
gradient index lens
   $N_0=1.70$, $N_1=-0.82720\times10^{-2}$, $N_2=0.12569\times10^{-4}$
   $V_0=50.0$, $V_1=300$, $V_2=300$
   t/f=2.46, $f^4 \cdot N_2=0.0163$, d/t=-1.63, $1/V_1=0.003$ Embodiment 3 f=4, F/4.0, max. image height=1.5, field angle 2 ω=43.2°

$r_1=\infty$ $d_1 = 1.000$   $n_1$ (gradient index lens)

$r_2=\infty$ (stop)

$d_2 = 10.468$   $n_1$ (gradient index lens)

$r_3=\infty$
gradient index lens
   $N_0=1.65$, $N_1=-0.19745\times10^{-1}$, $N_2=0.21139\times10^{-3}$
   $V_0=45.0$, $V_1=300$, $V_2=300$
   t/f=2.87, $f^4 \cdot N_2=0.0541$, d/t=0.25, $1/V_1=0.003$ Embodiment 4 f=5, F/2.8, max. image height=1.2, field angle 2 ω 27.70

$r_1=\infty$ (stop)

$d_1 = 7.117$   $n_1$ (gradient index lens)

$r_2=\infty$ $d_2 = 1.500$   $n_2 = 1.51633$   $v_2 = 64.2$ $r_3=\infty$
gradient index lens
   $N_0=1.55$, $N_1=-0.17043\times10^{-1}$, $N_2=-0.91293\times10^{-4}$
   $V_0=55.0$, $V_1=-100.0$, $V_2=-100.0$
   t/f=1.42, $f^4 \cdot N_2=-0.0571$, d/t=0, $1/V_1=-0.01$ wherein the reference symbols $r_1, r_2, \ldots$ represent radii of curvature on surfaces of respective lens elements, the reference symbols $d_1, d_2, \ldots$ designate distances between surfaces, the reference symbols $n_1, n_2, \ldots$ denote refractive indices of the lens elements, and the reference symbols $v_1, v_2, \ldots$ represent Abbe's numbers of the respective lens elements. In addition, values of refractive index $N_0$, distribution coefficients $N_1$ and $N_2$, and $V_0$ and $V_1$ representing dispersing powers are specified for the gradient index lens elements.

Figure 1:
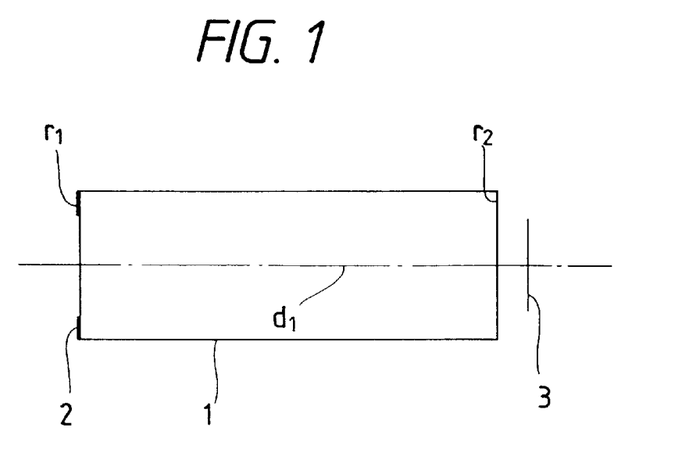
FIGS. 1 through 4 show sectional views illustrating first through fourth embodiments of the photographic lens component according to the present invention.

In the first embodiment, the gradient index lens component having planar surface on both the sides according to the present invention is used independently as shown in FIG. 1.

When an object is located at a distance of 1000, the gradient index lens component preferred as the first embodiment forms an image of the object at a location approximately 1 after the lens component.

The second embodiment is an example wherein an image side surface of the radial type gradient index lens component having planar surfaces on both sides according to the present invention is cemented to an image pickup surface by way of resin. It is configured to form an image on the image pickup surface when an object is located at a distance of approximately -10000. At an object distance far from 10000, the corresponding image will be blurred on the image pickup surface. This embodiment has a large F number of 1 and is highly advantageous for observing or photographing dark objects.

The third embodiment, in which the radial type gradient index lens component having planar surfaces on both sides according to the present invention is used independently, as shown in FIG. 3, is an example wherein an image side surface of the lens component is cemented directly to an image pickup surface. It is configured to form an image on the image pickup surface at an object distance of approximately 20. An image will be blurred at an object distance largely deviated from 20.

The fourth embodiment is an example where the radial type gradient index lens component having the planar surfaces on both sides is cemented to a protective glass plate of an image pickup device.

At an object distance of 1000, the fourth embodiment forms an image at a location approximately 1.5 after the protective glass plate. In regard to partial dispersion ratios in the embodiments of the present invention described above, axial dispersion ratios were calculated by Herzberger's dispersion formula while approximating terms of high orders uniformly to 0.3.

Though the lens component which is composed of a single radial type gradient index lens element is used independently as a photographic lens component in each of the embodiments described above, the gradient index lens component according to the present invention is usable as a component of a lens systems composed of combinations of lens components.

Concretely, a photographic lens system can be composed, for example, by combining an afocal converter with the gradient index lens component according to the present invention. Further, a photographic lens system for photographing objects located at short distances may be composed by combining a close-up lens component with the gradient index lens component according to the present invention. Furthermore, the gradient index lens component according to the present invention can be used as a rear converging lens component in retrofocus type photographic lens systems or a relay lens component (master lens component) in zoom lens systems.

As already described above, the present invention has an object to provide an image pickup apparatus having a lens function by integrating the gradient index lens component described above with an image pickup device.

Now, embodiments of the image pickup apparatus in which the gradient index lens components illustrated in FIGS. 1 through 4 are integrated with image pickup devices will be described with reference to the accompanying drawings.

Figure 5:
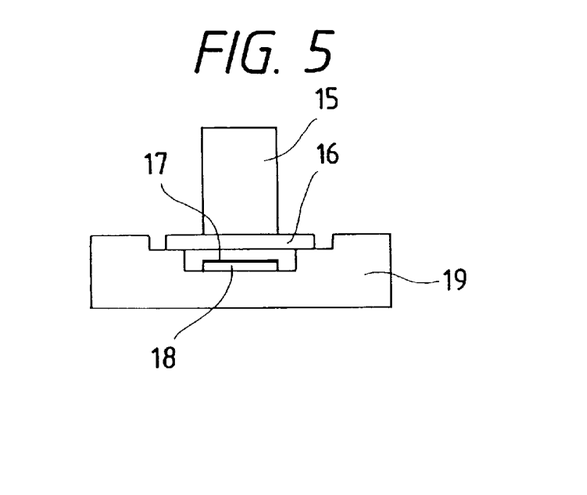
FIGS. 5 through 7 show sectional views illustrating first through third embodiments of the image pickup apparatus according to the present invention.

FIG. 5 illustrates a first embodiment of the image pickup apparatus consisting of the gradient index lens component integrated with an image pickup device, or an example wherein the gradient index lens component according to the present invention is cemented to a protective glass plate of an image pickup device. This embodiment utilizes the gradient index lens component shown in FIG. 4. In FIG. 5, reference numeral 15 represents the gradient index lens component, reference numeral 16 designates the protective glass plate, reference numeral 17 denotes an image pickup surface, reference numeral 18 represents an image pickup chip and reference numeral 19 designates a ceramic base plate.

Figure 6:
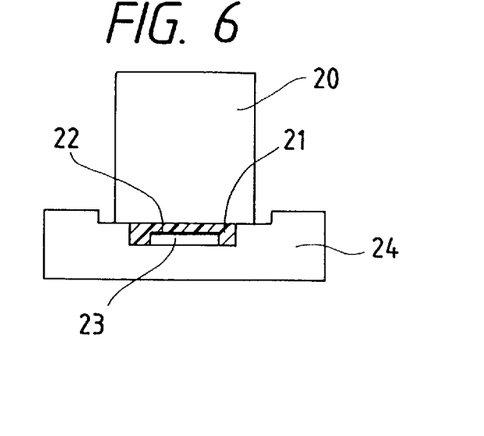

FIG. 6 shows a second embodiment of the image pickup apparatus according to the present invention which is an example wherein the radial type gradient index lens component according to the present invention is integrated with an image pickup device by way of resin. This embodiment uses the gradient index lens element shown in FIG. 2 so as to omit the protective glass plate which is conventionally used. In FIG. 6, reference numeral 20 represents the lens element, reference numeral 21 designates the resin (slashed), reference numeral 22 denotes an image pickup surface, reference numeral 23 represents an image pickup chip and reference numeral 24 designates a ceramic base plate.

Figure 7:
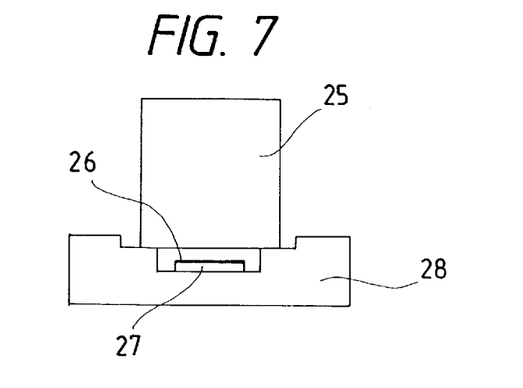

FIG. 7 shows a third embodiment of the image pickup apparatus according to the present invention which is an example wherein the gradient index lens component is integrated with an image pickup device while reserving a narrow airspace between the lens component and an image pickup surface of the image pickup device. Used in this embodiment is the first embodiment shown in FIG. 1 so as to omit the protective glass plate which is conventionally used. In FIG. 7, reference numeral 25 represents the lens component, reference numeral 26 designates the image pickup surface, reference numeral 27 denotes an image pickup chip and reference numeral 28 represents a ceramic base plate.

Figure 8A:
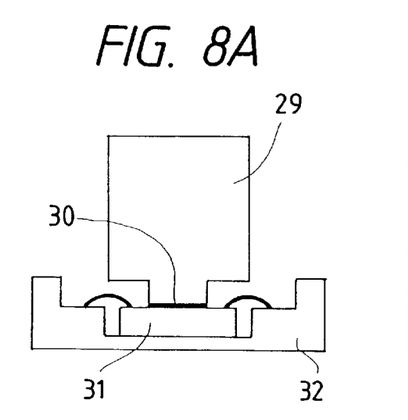
FIGS. 8A and 8B show sectional views illustrating a fourth embodiment of the image pickup apparatus according to the present invention.
Figure 8B:
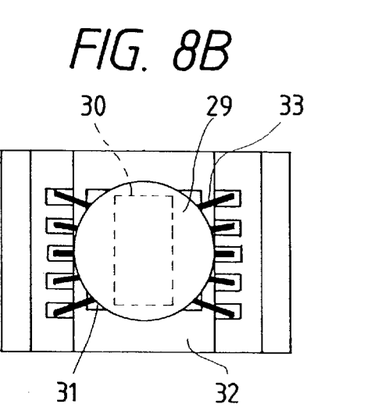

FIGS. 8A and 8B show a fourth embodiment of the image pickup apparatus according to the present invention which is an example wherein the gradient index lens component is cemented directly to an image pickup surface of an image pickup device. Used in this embodiment is the lens element shown in FIG. 3 so as to omit the protective glass plate which is conventionally used. In this example, the lens element has an image side surface which is worked so as to avoid interference due to wiring at a marginal portion of the image pickup chip. In FIGS. 8A and 8B, reference numeral 29 represents the lens component, reference numeral 30 designates the image pickup surface, reference numeral 31 denotes the image pickup chip, reference numeral 32 represents a ceramic base plate and reference numeral 33 designates wiring. In all the embodiments described above, side surfaces of the lens components or elements are sand-blasted and coated with a black paint for cutting off unwanted rays. An image pickup apparatus having a lens function can be obtained by integrating the radial type gradient index lens component composed of a single lens element with an image pickup device as described above. The image pickup apparatus which has an imaging function itself is capable of picking up images with no additional lens element. Though the radial type gradient index lens component having planar surfaces on both the sides is used in each of the examples shown in the accompanying drawings, a gradient index lens component can be integrated with an image pickup device so far as the lens component has a planar surface on the image side, or a curved object side surface does not hinder the integration.

Figure 9A:
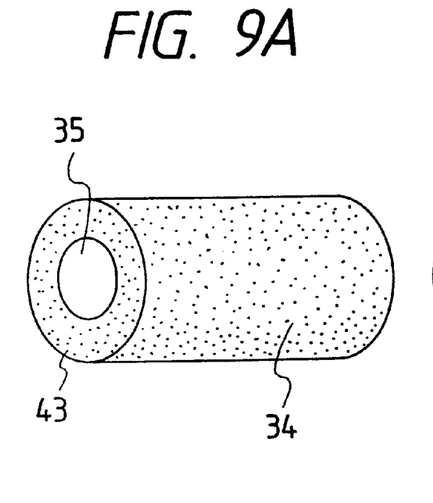
FIGS. 9A and 9B show perspective views illustrating structures of stops to be used in the first and second embodiments of the photographic lens component according to the present invention.
Figure 9B:
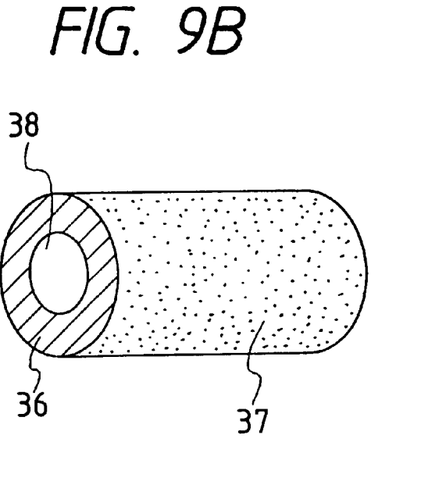
Figure 10A:
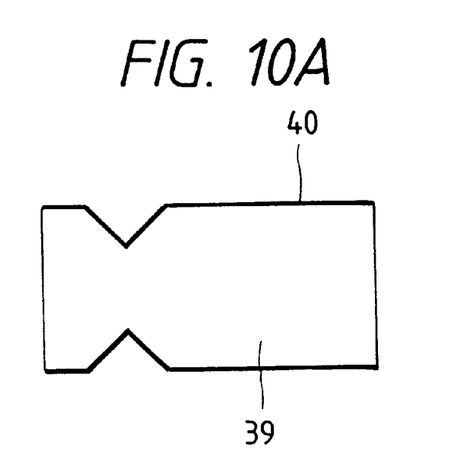
FIGS. 10A and 10B show sectional views illustrating a structure of a stop to be used in the fourth embodiment of the photographic lens component according to the present invention.
Figure 10B:
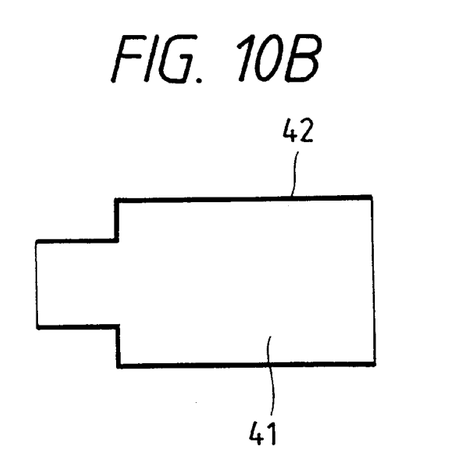

FIGS. 9A and 9B exemplify actual structures of the stops disposed on the object side surfaces of the lens components according to the present invention. FIG. 9A shows an example wherein a portion of the object side surface, to cut off unwanted rays is sand-blasted and coated with a black paint 43 so as to have a stop function. A side surface of the lens component is also sand-blasted and coated with a black paint 34. Reference numeral 35 represents an aperture of the lens component. FIG. 9B shows another example wherein a portion of an object side surface of the lens component, to cut off unwanted rays, has aluminium coating 36. A side surface of the lens component is coated with the black paint 37 like the side surface shown in FIG. 9A. Reference numeral 38 represents an aperture of the lens component. FIGS. 10A and 10B exemplify actual structures of the stop disposed in the lens component shown in FIG. 3. FIG. 10A shows an example wherein a V-shaped cut is formed in a side surface of the lens component so as to obtain a function of a stop which restricts a light bundle. The side surface and the V-shaped cut of the lens component are sand-blasted and coated with a black paint 40 for cutting off unwanted rays. Reference numeral 39 represents the lens component itself. FIG. 10B shows an example wherein the side surface of the lens component is cut stepwise for obtaining a function of a stop which restricts a light bundle. A side surface of the lens component and the steps are sand-blasted and coated with a black paint 42 for cutting off unwanted rays. A reference numeral 41 represents the lens component itself. By structuring stops as described above, it is possible to easily obtain stops without adding special members for composing stop mechanisms.

Figure 11A:
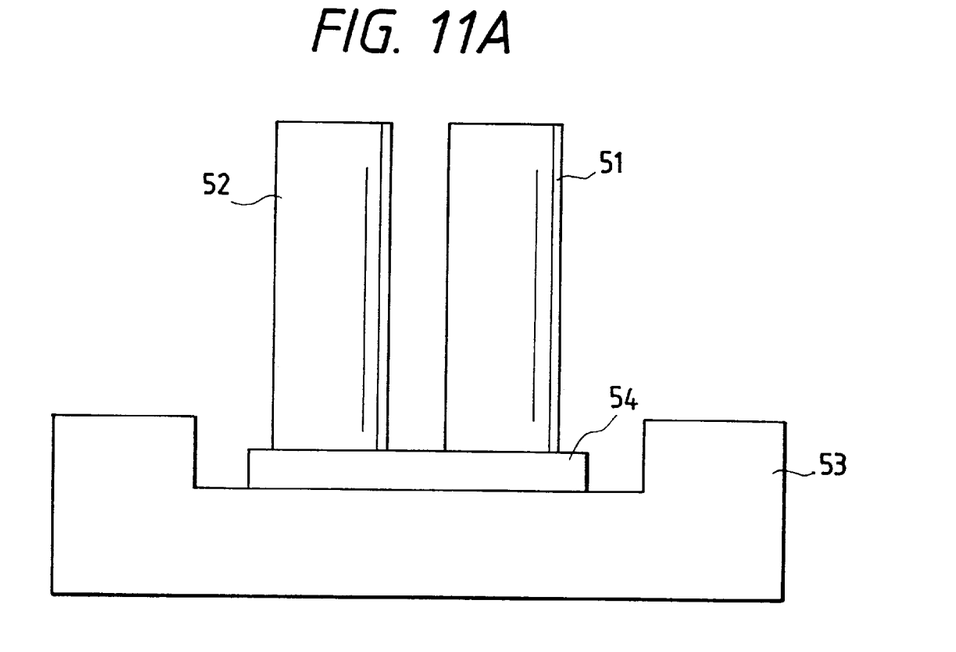
FIGS. 11A and 11B show diagrams illustrating a fifth embodiment of the image pickup apparatus according to the present invention.
Figure 11B:
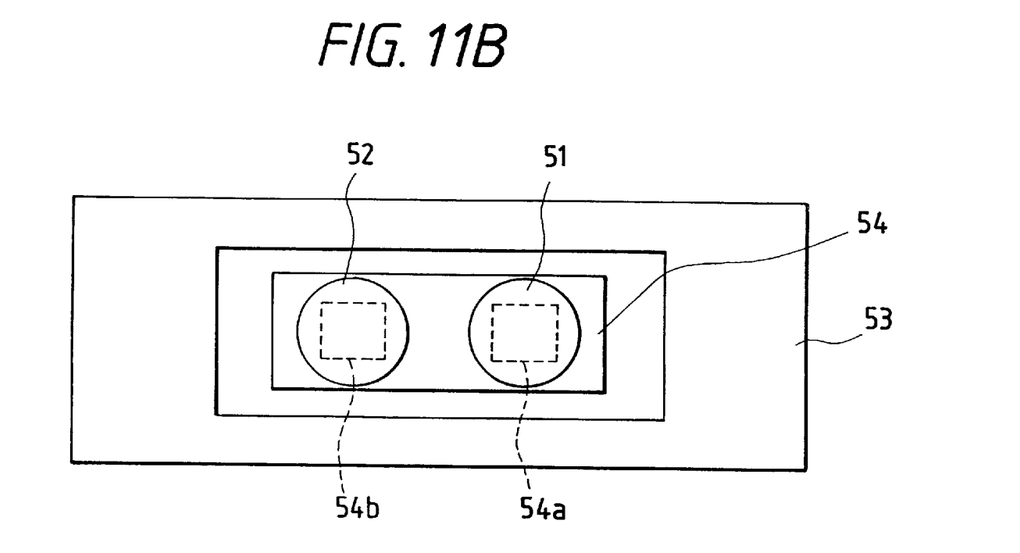

FIGS. 11A and 11B show a fifth embodiment of the image pickup apparatus according to the present invention. FIG. 11A is a side view of the fifth embodiment, whereas FIG. 11B shows a top view of the fifth embodiment.

The fifth embodiment is an image pickup apparatus for picking up a stereoscopic image having a structure wherein two optical systems 51 and 52 are disposed for right and left eyes respectively, a silicon chip 54 having an image pickup surface for the right eye 54*a* and an image pickup surface for the left eye 54*b* is bonded to a ceramic base plate 53, and a lens for the right eye 51 and a lens for the left eye 52 are cemented to the image pickup surfaces 54*a* and 54*b*.

This image pickup apparatus is an integrated unit which is independently capable of providing electrical signals for picking up a stereoscopic image.

As understood from the foregoing description, the present invention makes it possible to provide a lens system which is composed of a single lens element, can be manufactured at a low cost and has sufficient optical performance. Further, the present invention makes it possible to provide an image pickup apparatus which has a function of a photographic lens.

The gradient index lens component described above is usable as a component of lens systems comprising a plurality of lens components.

What is claimed is:

1. An image pickup apparatus, comprising:
   a radial type gradient index lens component having a planar surface on an image side thereof; and
   an image pickup device,
   wherein said image pickup device is cemented to said planar surface of said radial type gradient index lens component.

2. An image pickup apparatus according to claim 1 wherein said gradient index lens component is a radial type gradient index lens component having a refractive index distribution expressed by the formula shown below and satisfies the following condition (1):

$$n(r)=N_0+N_1 r^2+N_2 r^4+\ldots \quad -0.015<1/V_1<0.015 \quad (1)$$

wherein the reference symbol $n(r)$ represents a refractive index of a portion of said gradient index lens component located at a distance r in a direction perpendicular to an optical axis, the reference symbol $N_0$ designates a refractive index of a portion of said gradient index lens component located on the optical axis, the reference symbols $N_1$, $N_2$, ... denote refractive index distribution coefficients of the second, fourth, ... orders respectively, and the reference symbol $V_1$ represents a coefficient expressing an Abbe's number of a medium which is given by the following formula:

$$V_1=N_{1d}/(N_{1F}-N_{1C})$$

wherein the reference symbols $N_{1d}$, $N_{1F}$ and $N_{1C}$ represent values of the refractive index distribution coefficient of the second order for the d-line, F-line and C-line respectively.

3. An image pickup apparatus according to claim 2 comprising an aperture stop which is disposed on or in the vicinity of an object side surface of said gradient index lens component for restricting a light bundle, and further satisfying the following conditions (2), (3) and (4):

$$1<t/f<3.5 \quad (2)$$

$$-0.2<f^4 \cdot N_2<0.2 \quad (3)$$

$$-2<d/t<0.5 \quad (4)$$

wherein the reference symbol f represents a focal length of said lens component, the reference symbol t designates thickness of said lens component-and the reference symbol d denotes a distance as measured from the object side surface of said lens component to the aperture stop in a direction along the optical axis.

4. An image pickup apparatus according to claim 3, said image pickup apparatus further comprising:
   a second radial type gradient index lens component having a planar surface on an image side thereof,
   wherein said second radial type gradient index lens component is cemented to said image pickup device on said image side surface of said second radial type gradient index lens components.

5. An image pickup apparatus according to claim 4, wherein each of said gradient index lens components has a refractive index distribution expressed by the formula shown below and satisfies the following condition (1):

$$n(r)=N_0+N_1 r^2+N_2 r^4+\ldots \quad -0.015<1/V_1<0.015 \quad (1)$$

wherein the reference symbol $n(r)$ represents a refractive index of a portion of said gradient index lens component located at a distance r in a direction perpendicular to an optical axis, the reference symbol $N_0$ designates a refractive index of a portion of said gradient index lens component located on the optical axis, the reference symbols $N_1$, $N_2$, ... denote refractive index distribution coefficients of the second, fourth, ... orders respectively, and the reference symbol $V_1$ represents a coefficient expressing an Abbe's number of a medium which is given by the following formula:

$$V_1=N_{1d}/(N_{1F}-N_{1C})$$

wherein the reference symbols $N_{1d}$, $N_{1F}$ and $N_{1C}$ represent values of the refractive index distribution coefficient of the second order for the d-line, F-line and C-line respectively.

6. An image pickup apparatus according to claim 1, 2 or 3 wherein said gradient index lens component has a diameter which is larger than that of a image pickup surface of said image pickup device, wherein the said gradient index lens component has a small-diameter portion which is formed by cutting off an outer circumferential portion from one end and wherein said small-diameter portion is opposed to said image pickup surface and integrated therewith.

7. An image pickup apparatus according to claim 6, wherein said cementing of said image side surface of said radial type gradient index lens component and said image pickup device further comprises cementing a protecting glass of said image pickup device to said image side surface of said radial type gradient index lens component.

8. An image pickup apparatus according to claim 6, wherein cement used to cement said image side surface of said radial type gradient index lens component and said image pickup device further comprises a resin cement.

9. An image pickup apparatus according to claim 6, wherein said image pickup device comprises
   an image pickup chip which receives light; and
   a base adapted to hold said image pickup chip, and
   wherein said gradient index lens component is cemented to said image pickup device such that a peripheral portion of said radial type gradient index lens is cemented to said base, and
   an airspace is maintained between said image side surface of said radial type gradient index lens component and said image pickup chip.

10. An image pickup apparatus according to any claim 6, wherein said image pickup device comprises an image pickup chip which receives light; and
   a base adapted to hold said image pickup chip, and
   wherein said image side surface of said radial type gradient index lens component and said image pickup chip are cemented directly to each other.

11. An image pickup apparatus, comprising:
   a lens component having a planar surface on an image side thereof;

an image pickup device; and an aperture stop which is disposed inside of said lens component, wherein said image pickup device is cemented to an image side surface of said lens component.

12. An image pickup apparatus comprising a lens component having a planar surface on an image side thereof and an image pickup device integrated with said lens component, and an aperture stop which is disposed inside of said lens component.

13. An image pickup apparatus as in claim 12 wherein said image pickup device is cemented to an image side surface of said lens component.

14. An image pickup apparatus, comprising:

a lens component having a planar surface on an image side thereof;

an image pickup device; and an aperture stop which is disposed on a light incident surface of said lens component, wherein said image pickup device is cemented to an image side surface of said lens component.

15. An image pickup apparatus comprising, in order from an object side thereof, an aperture stop;

a lens component having a planar surface on an image side thereof; and an image pickup device, wherein said image pickup device is cemented to an image side surface of said lens component.

16. An image pickup apparatus comprising:

a plurality of lens components each having a planar surface on an image side thereof; and an image pickup device, wherein said image pickup device is cemented to an image side surface of each of said lens components.

17. An image pickup apparatus comprising:

two radial type gradient index lens components each having a planar surface on an image side thereof; and an image pickup device, wherein said image pickup device is cemented to an image side surface of each of said lens components.

18. An image pickup apparatus, comprising:

a radial type gradient index lens component having a planar surface on an image side;

an image pickup device integrated with said lens component, wherein said gradient index lens component is a radial type gradient index lens component having a refractive index distribution expressed by the following condition (1);

$$n(r)=N_0+N_1 r^2+N_2 r^4+\ldots \quad -0.015<1/V_1<0.015 \qquad (1)$$

wherein the reference symbol n(r) represents a refractive index of a portion of said gradient index lens component located at a distance r in a direction perpendicular to an optical axis, the reference symbol $N_0$ designates a refractive index of a portion of said gradient index lens component located on the optical axis, the reference symbols $N_1$, $N_2$, ... denote refractive index distribution coefficients of the second, fourth, ... orders respectively, and the reference symbol VI represents a coefficient expressing an Abbe's number of a medium which is given by the following formula:

$$V_1=N_{1d}/(N_{1F}-N_{1C})$$

wherein the reference symbols $N_{1d}$, $N_{1F}$ and $N_{1C}$ represent values of the refractive index distribution coefficient of the second order for the d-line, F-line and C-line respectively.

19. An image pickup apparatus according to claim 18, further comprising an aperture stop which is disposed on or in the vicinity of an object side surface of said gradient index lens component for restricting a light bundle, and further satisfying the following conditions (2), (3) and (4):

$$1<t/f<3.5 \qquad (2)$$

$$-0.2<f^4 \cdot N_2<0.2 \qquad (3)$$

$$-2<d/t<0.5 \qquad (4)$$

wherein the reference symbol f represents a focal length of said lens component, the reference symbol t designates thickness of said lens component, the reference symbol d denotes a distance as measured from the object side surface of said lens component to the aperture stop in a direction along the optical axis and the reference symbol $N_2$ denotes the refractive index distribution coefficient of the second order.

20. An image pickup apparatus according to claim 18 or 19 wherein, said gradient index lens component has a diameter which is larger than that of an image pickup surface of said image pickup device, wherein said gradient index lens component has a small-diameter portion which is formed by cutting off an outer circumferential portion from one end and wherein said small-diameter portion is opposed to said image pickup surface and integrated therewith.

21. An image pickup apparatus comprising:

a first radial type gradient index lens component having a planar surface on an image side thereof;

a second radial type gradient index lens component having a planar surface on and image side thereof; and an image pickup device, wherein each of said first and second radial type gradient index lens components is integrated with said image pickup device, and wherein each of said first and second radial type gradient index lens components has a refractive index distribution expressed by the formula shown below and satisfies the following condition (1):

$$n(r)=N_0+N_1 r^2+N_2 r^4+\ldots \quad -0.015<1/V_1<0.015 \qquad (1)$$

wherein the reference symbol n(r) represents a refractive index of a portion of said gradient index lens component located at a distance r in a direction perpendicular to an optical axis, the reference symbol $N_0$ designates a refractive index of a portion of said gradient index lens component located on the optical axis, the reference symbols $N_1$, $N_2$, ... denote refractive index distribution coefficients of the second, fourth, ... orders respectively, and the reference symbol $V_1$ represents a coefficient expressing an Abbe's number of a medium which is given by the following formula:

$$V_1=N_{1d}/(N_{1F}-N_{1C})$$

wherein the reference symbols $N_{1d}$, $N_{1F}$ and $N_{1C}$ represent values of the refractive index distribution coefficient of the second order for the d-line, F-line and C-line respectively.

22. An image pickup apparatus according to any one of claims 1–3, 4, 15, 16 or 17; wherein said cementing of said image side surface of said radial type gradient index lens component and said image pickup device further comprises cementing a protecting glass of said image pickup device to said image side surface of said radial type gradient index lens component.

23. An image pickup apparatus according to any one of claims 1–3, 4, 15, 16 or 17, wherein cement used to cement said image side surface of said radial type gradient index lens component and said image pickup device further comprises a resin cement.

24. An image pickup apparatus according to any one of claims 1, 3, 4, 15, 16 or 17, wherein said image pickup device comprises an image pickup chip which receives light; and a base adapted to hold said image pickup chip, and wherein said gradient index lens component is cemented to said image pickup device such that a peripheral portion of said radial type gradient index lens is cemented to said base, and an airspace is maintained between said image side surface of said radial type gradient index lens component and said image pickup chip.

25. An image pickup apparatus according to any one of claims 1–3, 4, 15, 16 or 17, wherein said image pickup device comprises an image pickup chip which receives light; and a base adapted to hold said image pickup chip, and wherein said image side surface of said radial type gradient index lens component and said image pickup chip are cemented directly to each other.

* * * * *